Nov. 10, 1942.　　　　J. L. BREESE　　　　2,301,512
VENTILATING APPARATUS
Filed Jan. 9, 1939　　　2 Sheets-Sheet 2
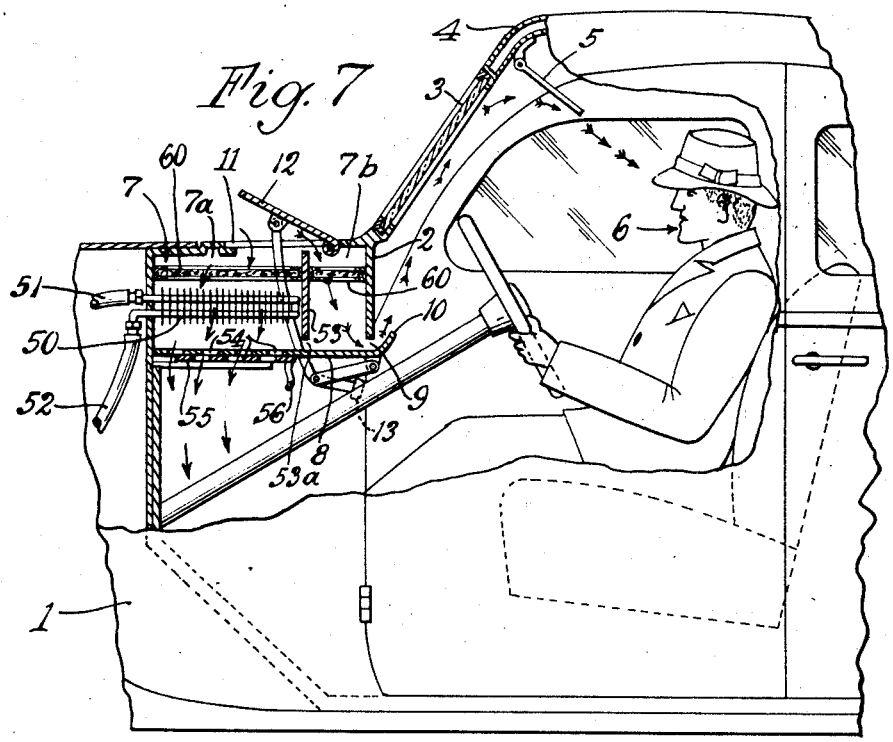
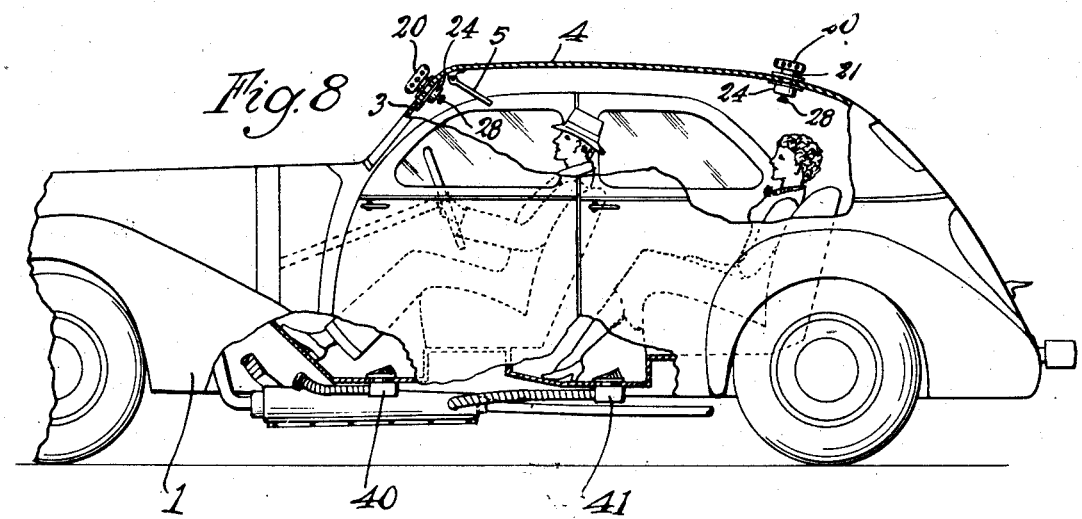
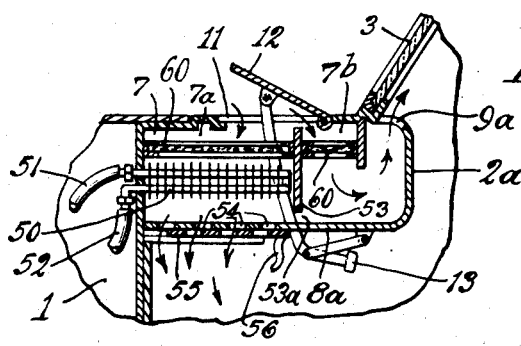
Inventor
James L. Breese
by Parker & Carter
Attorneys Patented Nov. 10, 1942

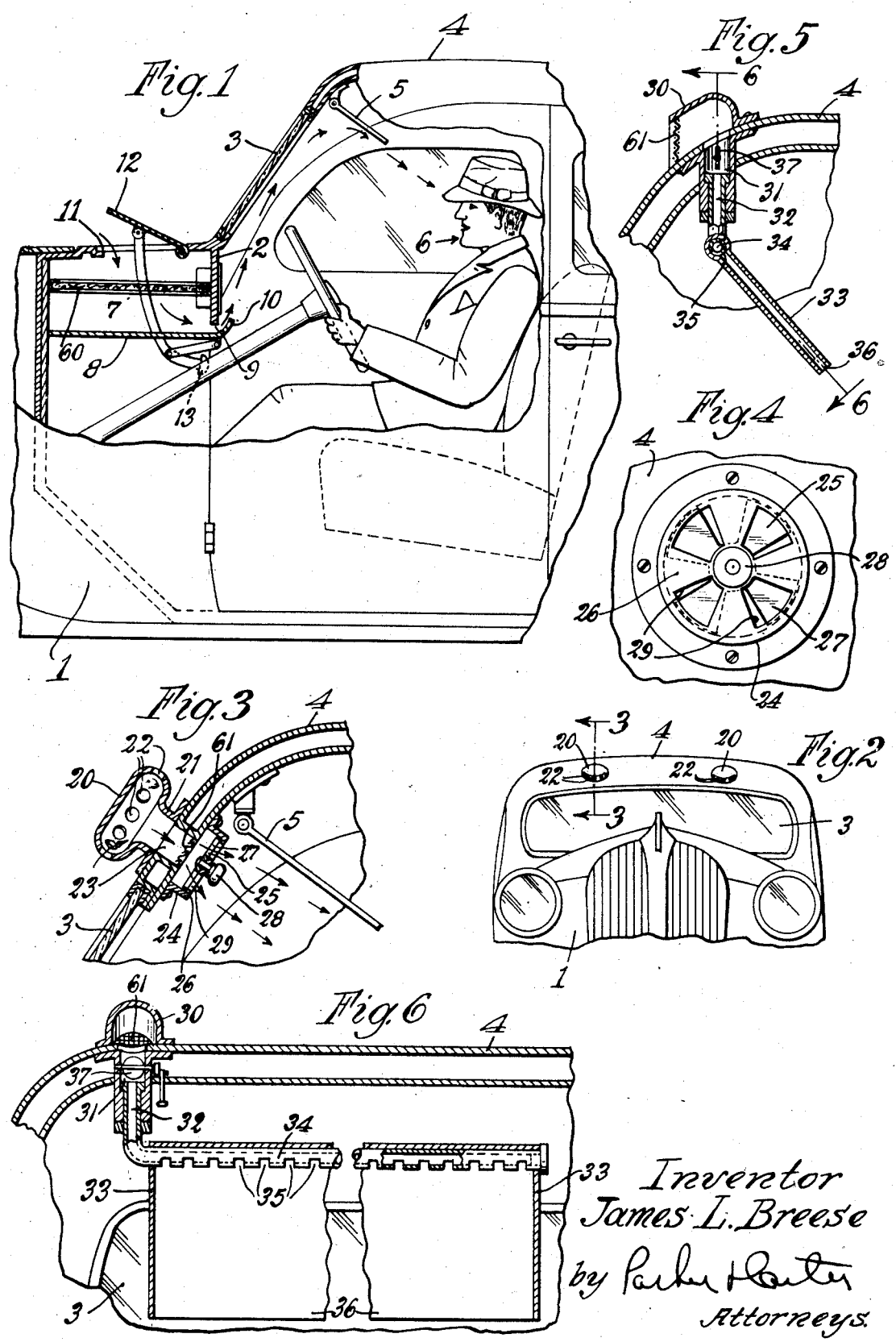
Nov. 10, 1942. J. L. BREESE 2,301,512
VENTILATING APPARATUS
Filed Jan. 9, 1939 2 Sheets-Sheet 1
Inventor
James L. Breese
by Parker & Carter
Attorneys.

2,301,512

UNITED STATES PATENT OFFICE 2,301,512

VENTILATING APPARATUS

James L. Breese, Santa Fe, N. Mex.

Application January 9, 1939, Serial No. 249,992

4 Claims. (Cl. 98—2)

My invention relates to an improvement in air circulation means for automobiles and the like.

One purpose is the provision of means for varying the temperature and velocity of the air in different parts of the vehicle and, for example, for delivering relatively cool air toward the face of the driver, or the faces of other passengers in the front or rear.

Another purpose is the provision of means for delivering to the interior of an automobile outside air at varying temperatures, whereby heated air may be delivered to one part of the car and cool or cooler air to another part.

Another purpose is the provision of means for directing a cooling flow of air directly upwardly along the inner face of the windshield, preferably from a point or area above the instrument panel.

Another purpose is the provision of means for controlling the direction of flow of outside air whereby both in summer and in winter outside air may be directed toward the face of the operator or toward any other part of the car or any object which it is desirable to keep relatively cool.

Another purpose is the provision of a complete air conditioning system in which the air entering the car is filtered, heated or cooled if desired, and is directed to the desired part of the car.

Other objects will appear from time to time in the course of the specification and claims.

I illustrate my invention more or less diagrammatically in the accompanying drawings wherein:

Fig. 1 is a side elevation with parts in section;

Fig 2 is a partial front view of an automobile;

Fig. 3 is a section on the line 3—3 of Fig. 2 on an enlarged scale;

Fig. 4 is an inside view of a portion of the structure shown in Fig. 3;

Fig. 5 is a vertical longitudinal section through a variant form of the device;

Fig. 6 is a section on the line 6—6 of Fig. 5;

Fig. 7 is a view similar to Fig. 1 through a variant form of the device;

Fig. 8 is a side elevation with parts in section of a still further variant form of my invention; and Fig. 9 is a vertical section through a variant structure.

Like parts are indicated by like characters throughout the specification and drawings.

Referring to the drawings and to the form of Fig. 1, 1 generally indicates an automobile, 2 being the dash board, 3 the windshield, 4 the roof, and 5 the sun visor. 6 generally indicates the head or face of the driver. 7 indicates a compartment to the rear of the dash board with a bottom 8, a rear outlet 9, and a directing lip 10 which may be part of the bottom 8 and which is adapted to direct air from the interior of the chamber 7 upwardly generally along the inner face of the windshield 3 and against the sun visor 5. The sun visor 5 may be set at any suitable angle whereby to deflect the air.

The parts are shown in a position to cause outside air to be directed against the face 6 of the driver, as indicated by the arrows. Air is admitted to the chamber 7 through any suitable aperture 11 controlled by the shutter or gate 12 which in turn may be operated by any suitable handle 13. In this form of my device no heating means are indicated but it will be understood that any suitable conventional heater may be employed, and Fig. 1 should be read as if to include a conventional car heater whereby air inside the car may be heated.

Referring to Figs. 2, 3 and 4, I find it desirable to direct air inwardly through a body or roof in general alinement with the base or head of the operator. I illustrate for an example an inlet head 20, a stem 21 and apertures 22 in the side of the head. The stem 21 is in communication with a passage 23 through the roof of the car 4, which passage is in communication with an inner housing 24 controlled by any suitable shutter 25, herein shown as including a fixed part 26 and a movable part 27 controlled by a knob 28 whereby the apertures 29 may be masked or unmasked.

It will be understood that any suitable type of shutter arrangement may be employed and the shutter may be designed itself to vary the direction of the air delivery. However, I find a shutter of the type herein shown as practical and the passages may be alined generally with the face of the operator. I further find it advantageous to employ a vane or the like 5 which may be the conventional sun visor as a further means for controlling the direction of air delivery.

Referring to the form of Figs. 5 and 6, I illustrate an inlet member 30 in communication with an inlet passage 31 which in turn communicates with a hollow stem 32 upon which is mounted a hollow sun visor 33. The stem 32 may include a generally horizontal portion 34 with air outlet apertures 35, whereby air received through the member 30 may be delivered through the passage 31 into the hollow body 33 of the sun visor for discharge as from the passage or slit 36. The member 33 is available for conventional sun visor use, but it may also be employed as a means for directing air from outside. Any suitable means may be employed for preventing the inflow of air, for example the valve means shown at 37.

Referring to Fig. 2, it will be understood that a plurality of air inlet members 20 may be employed, whereby air may be admitted to a plurality of users. In Fig. 2 I illustrate two members 20 at the front of the car for the use of the two front seats. In Fig. 8 I illustrate a further variation in which additional members 20 are alined with the back seat of the car. It will be understood also that in the form of Figs. 2 to 4, heating means may also be employed, as shown for example at 40, 41 in Fig. 8, an exhaust heater being illustratively indicated.

Referring to Fig. 7, I illustrate substantially the structure of Fig. 1 with a further addition of a heating coil which may, for example, be connected by the passages 51 and 52 with heating liquid in the radiator. 53 is a baffle or wall dividing the compartment 7 into two parts, 7a and 7b. Air from 7a may be admitted through the apertures 54 in the bottom wall 8, the apertures being controlled by any suitable shutter 55 controlled by a handle 56. Thus outside air which enters through the passage 11 is heated by the coil 50 and passes to the lower portion of the car. At the same time, unheated or partially heated air passes to the right of the baffle 53 and escapes through the passage 9 to be directed by the lip 10 upwardly toward the sun visor 5. Thus I may thereby take in outside air, heat part of it, and admit part of it unheated or only partly heated.

Where a partial heating effect is desired, the partition 53 may be cut down or omitted. Thus I show the partition 53 in Fig. 7 as provided with an aperture or gap 53a at or in its lower edge, so that a portion of the air heated by the heater 50 may flow from the chamber 7a to the chamber 7b and mingle with the unheated air flowing into the top of the chamber 7b. Thus heated air may be mixed with the cold air to obtain for the face of the passenger or passengers air at a lower temperature than the completely heated air which flows through the apertures 54, but not as cold as the entirely unheated air entering the compartment 7b. Preferably the gap 53a is so proportioned with relation to the holes 54 and the slot 9 as to be less than the effective area of the inlet 11. Under these conditions, the compartments 7a and 7b will always be subjected to pressure. If the holes 54 are partially closed, the pressure in the compartment 7a will become greater than the pressure in the compartment 7b and some of the heated air will mix with the cold air already passing into and through the compartment 7b. Thus I provide a convenient and simple means of controllably mixing heated air with the normally unheated air passing into and through the compartment 7b. There will then be a partial heating through the aperture 9.

In Figure 9 I illustrate means for directing a flow of cooling air upwardly and inwardly along the windshield from an area of discharge directly adjacent the lower edge of the windshield. The air passes upwardly through an aperture or apertures 9a above the instrument panel 2a, the instrument panel 2a being joined at its bottom to the bottom baffle or partition 8a, as shown in Figure 9.

It will be realized that whereas I have described and illustrated practical and operative embodiments of my invention and the method for carrying it out, nevertheless many changes may be made in the size, shape, number and disposition of parts without departing from the spirit of my invention. I therefore wish my description and drawings to be taken as in a broad sense illustrative or diagrammatic, rather than as limiting me to my precise showing. The use and operation of my invention are as follows:

In the summer or in hot weather, there is a natural moisture on the face of an automobile driver which may be evaporated, under the influence of a stream of inflowing air. This evaporation results in a cooling sensation and a substantial reduction of the surface temperature of the part of the body struck by the actual stream of air. All of the forms of my device herein shown provide means for directing an inflowing stream of outside air, slightly heated or not heated at all, toward the face of the user. Thus all forms of my device may be employed for driving in summer or in hot countries.

For winter driving, where it is advantageous or necessary to heat the air inside the car, or to draw heated air into the space around the driver, it has been found that to keep the body properly warm it is necessary to have the air at a temperature which is unpleasant on the face and which may cause discomfort and even dizziness and drowsiness. My invention is directed to the successive or the combined combination of delivering air into a car at two different temperatures.

Referring for example to Fig. 9, I find it advantageous to deliver a cooling current of air upwardly and inwardly along the inner face of the windshield 3 through directing apertures 9a located preferably above the instrument panel.

Referring to Fig. 7, part of the inflowing air is heated directly by the heater 50 and is delivered preferably to the lower part of the car, for example to the feet of the user, whence it rises. But the part which directly strikes his face or head is preferably only partially heated, or it is not heated at all, and passes to the right of the partition 53 and upwardly past the lip 10 to the sun visor 5 and thus to the face of the user. Thus, in winter driving the operator is receiving heated air on the lower part of his body and is receiving cool air or cooler air on his face.

In the form of Figs. 7 and 9, by employing the vent 53a between the compartments 7a and 7b, and by having the total area of the outlets from the two compartments less than the effective cross sectional area of the inlet 11, I not only maintain a pressure within the two compartments, but am able to mix heated air from compartment 7a with the cool air of compartment 7b by merely controlling the area of the discharge apertures 54 of the compartment 7a. Thus I can deliver partly warmed air to the face of the passengers, by controlling the flow of warm air from the compartment 7a to the compartment 7b.

However, whereas I find it advantageous thus selectively to treat the inflowing air, I may employ the form of the other figures in connection with any conventional inside car heater. In the form of Fig. 1, for example, the inflowing air is none of it heated but is all directed upwardly by the lip 10 and then downwardly by the sun visor toward the driver. But the general body of air inside the car may be heated by an electric heater or by an exhaust heater, as is shown in the form of Fig. 8.

In the operation of the system, the car is under pressure, the windows and doors all being preferably closed. The air as it enters can be filtered and any conventional filter structure may be employed, as shown at 60 in Figs. 1 and 7, and as at 61 in Figs. 3 and 5. Thus the air is in a real sense conditioned.

A further effect of the maintenance of pressure in the car is to prevent any entry by suction of dirty air from the engine or from the exhaust or from the road. In the normal car, where open ventilation is employed, as in the so-called "no draft" ventilation, there is a suction of exhaust gases and dirt and dust into the interior of the car. Some may come from beneath the hood of the engine, some may come through the doors and windows, and some through leaks in the body or floor.

My apparatus and method entirely prevent this and, instead, I maintain a pressure in the car, since all the doors and windows are kept closed and additional outside air is admitted. There is sufficient leakage in the windows and doors to permit the excess air out through them. The inflowing air being filtered, the dust is eliminated. There is, therefore, no suction of dust, gases or the like into the car. This is the advantage of maintaining the car under pressure, in contrast to the maintenance of a constant vacuum by so-called "no draft" ventilation.

Furthermore, the closing of the windows practically eliminates outside noise and the definite pulsation effect which takes place with an open window.

I claim:

1. In combination with a normally closed vehicle having a cowl, a windshield and an instrument panel, and a partition located forwardly of the instrument panel and to the rear of the engine, a bottom wall extending rearwardly from said partition and defining, with said partition and instrument panel and cowl, a plenum chamber, the rear edge of said wall being below and to the rear of the lower edge of the instrument panel and defining therewith an aperture for the discharge of air from the plenum chamber to the interior of the vehicle, and means for building up pressure in said plenum chamber in response to the forward movement of the vehicle, including a closure movably mounted in relation to said cowl, said cowl having an aperture adapted to be closed by said closure when the closure is in closing position the rear edge of the bottom wall terminating in an upwardly turned lip to the rear of the instrument panel.

2. In combination with a normally closed vehicle having a cowl, a windshield and an instrument panel, and a partition located forwardly of the instrument panel and to the rear of the engine, a bottom wall extending rearwardly from said partition and defining, with said partition and instrument panel and cowl, a plenum chamber, the rear edge of said wall being spaced from the lower edge of the instrument panel and defining therewith an aperture for the discharge of air from the plenum chamber to the interior of the vehicle, and means for building up pressure in said plenum chamber in response to the forward movement of the vehicle, including a closure movably mounted in relation to said cowl, said cowl having an aperture adapted to be closed by said closure when the closure is in closing position, the rear edge of said bottom wall having an upwardly turned air directing lip terminating to the rear of said instrument panel.

3. In combination with a normally closed vehicle having a cowl, a windshield and an instrument panel, and a partition located forwardly of the instrument panel and to the rear of the engine, a bottom wall extending rearwardly from said partition and defining, with said partition and instrument panel and cowl, a plenum chamber, the rear edge of said wall being spaced from the lower edge of the instrument panel and defining therewith an aperture for the discharge of air from the plenum chamber to the interior of the vehicle, and means for building up pressure in said plenum chamber in response to the forward movement of the vehicle, including a closure movably mounted in relation to said cowl, said cowl having an aperture adapted to be closed by said closure when the closure is in closing position, the rear edge of said bottom wall having an upwardly turned air directing lip terminating to the rear of said instrument panel, and an adjustable air deflector located on said vehicle above the instrument panel and in the line of delivery of air from said upturned lip.

4. In combination with a normally closed vehicle having a cowl, a windshield and an instrument panel, and a partition located forwardly of the instrument panel and to the rear of the engine, a bottom wall extending rearwardly from said partition and defining, with said partition and instrument panel and cowl, a plenum chamber, said plenum chamber having an outlet aperture adapted for the delivery of air from said chamber into the interior of the vehicle, said aperture being defined in part by the lower edge of said instrument panel and in part by the bottom wall, the rear edge of the wall being provided with an upwardly turned lip, and means for building up pressure in said plenum chamber in response to the forward movement of the vehicle, including a closure movably mounted in relation to said cowl, said cowl having an aperture adapted to be closed by said closure when the closure is in closing position the rear edge of the bottom wall extending rearwardly beyond and out of contact with the instrument panel and provided with said upwardly turned lip.

JAMES L. BREESE.